United States Patent
Nishijima (10) Patent No.: US 10,841,502 B2
(45) Date of Patent: Nov. 17, 2020

(54) IMAGING APPARATUS HAVING AUTOMATICALLY ADJUSTABLE IMAGING DIRECTION

(71) Applicant: TOYOTA JIDOSHA KABUSHIKI KAISHA, Toyota (JP)

(72) Inventor: Masakazu Nishijima, Ebina (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/170,437

(22) Filed: Oct. 25, 2018

(65) Prior Publication Data

US 2019/0132525 A1 May 2, 2019

(30) Foreign Application Priority Data

Oct. 27, 2017 (JP) .................. 2017-208161

(51) Int. Cl.
*H04N 5/232* (2006.01)
*H04N 5/18* (2006.01)
*G06T 7/70* (2017.01)
*B60R 1/00* (2006.01)
*H04N 7/18* (2006.01)

(52) U.S. Cl.
CPC .......... *H04N 5/23299* (2018.08); *B60R 1/00* (2013.01); *G06T 7/70* (2017.01); *H04N 5/23203* (2013.01); *H04N 7/183* (2013.01)

(58) Field of Classification Search
CPC ........ B60W 2420/403; B60W 2420/42; B60Y 2400/3015; B60R 2300/00–108
USPC ................. 701/1; 348/169, 46, 144; 250/330
See application file for complete search history.

(56) References Cited

U.S. PATENT DOCUMENTS

| | | | | |
|---|---|---|---|---|
| 2006/0104633 A1* | 5/2006 | Kenoyer | ............... | F16M 11/10 396/428 |
| 2009/0135292 A1* | 5/2009 | Muramatsu | ........... | H04N 9/045 348/349 |
| 2010/0033571 A1* | 2/2010 | Fujita | .................... | B60W 40/02 348/149 |
| 2010/0103251 A1* | 4/2010 | Numako | .............. | G02B 27/646 348/61 |
| 2011/0292217 A1* | 12/2011 | Ohta | ..................... | H04N 5/225 348/169 |
| 2012/0197439 A1* | 8/2012 | Wang | ........................ | B25J 5/00 700/259 |

(Continued)

FOREIGN PATENT DOCUMENTS

JP   2013-177098 A    9/2013
JP   2013177098 A  *  9/2013

*Primary Examiner* — Xi Wang
(74) *Attorney, Agent, or Firm* — Sughrue Mion, PLLC (57) ABSTRACT

An imaging apparatus is configured to photograph an image of a scene ahead of a vehicle. The imaging apparatus is provided with: an actuator configured to move an imaging range in an upward/downward direction by moving an imaging sensor in the upward/downward direction and adjusting a relative position of the imaging sensor with respect to a lens; a calculator configured to calculate a reference angle, which is an angle made by a line extending in a moving direction of the vehicle from the imaging sensor and a line extending to a traffic light, which is ahead of the vehicle, from the imaging sensor; and a controller programmed to control the actuator to include the traffic light in the imaging range on the basis of the reference angle.

7 Claims, 8 Drawing Sheets

(56) References Cited

U.S. PATENT DOCUMENTS

2013/0338525 A1* 12/2013 Allen .................... A61B 5/0062
600/534
2014/0313373 A1* 10/2014 Sugawara ................. G06T 5/50
348/239

* cited by examiner

IMAGING APPARATUS HAVING AUTOMATICALLY ADJUSTABLE IMAGING DIRECTION

CROSS-REFERENCE TO RELATED APPLICATIONS

This application is based upon and claims the benefit of priority of the prior Japanese Patent Application No. 2017-208161, filed on Oct. 27, 2017, the entire contents of which are incorporated herein by reference.

BACKGROUND

1. Technical Field

Embodiments of the present disclosure relate to an imaging apparatus configured to image or photograph an image of a scene ahead of a vehicle.

2. Description of the Related Art

In this type of imaging apparatus, an imaging direction is fixed. Thus, when a vehicle stops at a red light, a traffic light, which is located at a higher position as viewed from the vehicle, is sometimes out of an imaging range. As a measure of avoiding such a situation, for example, there is disclosed a technology/technique in which the vehicle is set to be stopped at a recognition limit distance at which the traffic light can be recognized by an imaging apparatus when the vehicle stops at the red light (refer to Japanese Patent Application Laid Open No. 2013-177098 (Patent Literature 1)).

The recognition limit distance described in the Patent Literature 1 described above, however, may be set significantly before (e.g., several meters before) a stop line. In this case, the vehicle may stop at a position at which the vehicle is originally not to stop, and this is not desirable from the viewpoint of following traffic rules.

On the other hand, there is also a possible measure of changing the direction of the imaging apparatus (e.g., directing the imaging apparatus upward to allow the traffic light located above to come in sight) when the vehicle stops; however, there may be a significant impact in changing the direction, which may also deteriorate durability of the apparatus. A high electric power is also required to drive the apparatus, which is technically problematic.

SUMMARY

In view of the aforementioned problems, it is therefore an object of embodiments of the present disclosure to provide an imaging apparatus configured to image or photograph a traffic light even when a vehicle stops.

The above object of embodiments of the present disclosure can be achieved by an imaging apparatus configured to photograph an image of a scene ahead of a vehicle, the imaging apparatus provided with: an actuator configured to move an imaging range in an upward/downward direction by moving an imaging sensor in the upward/downward direction and adjusting a relative position of the imaging sensor with respect to a lens; a calculator configured to calculate a reference angle, which is an angle made by a line extending in a moving direction of the vehicle from the imaging sensor and a line extending to a traffic light, which is ahead of the vehicle, from the imaging sensor; and a controller programmed to control the actuator to include the traffic light in the imaging range on the basis of the reference angle.

DETAILED DESCRIPTION OF THE EMBODIMENTS

Hereinafter, an imaging apparatus according to an embodiment will be explained with reference to the drawings.

<Configuration of Apparatus>

Figure 1:
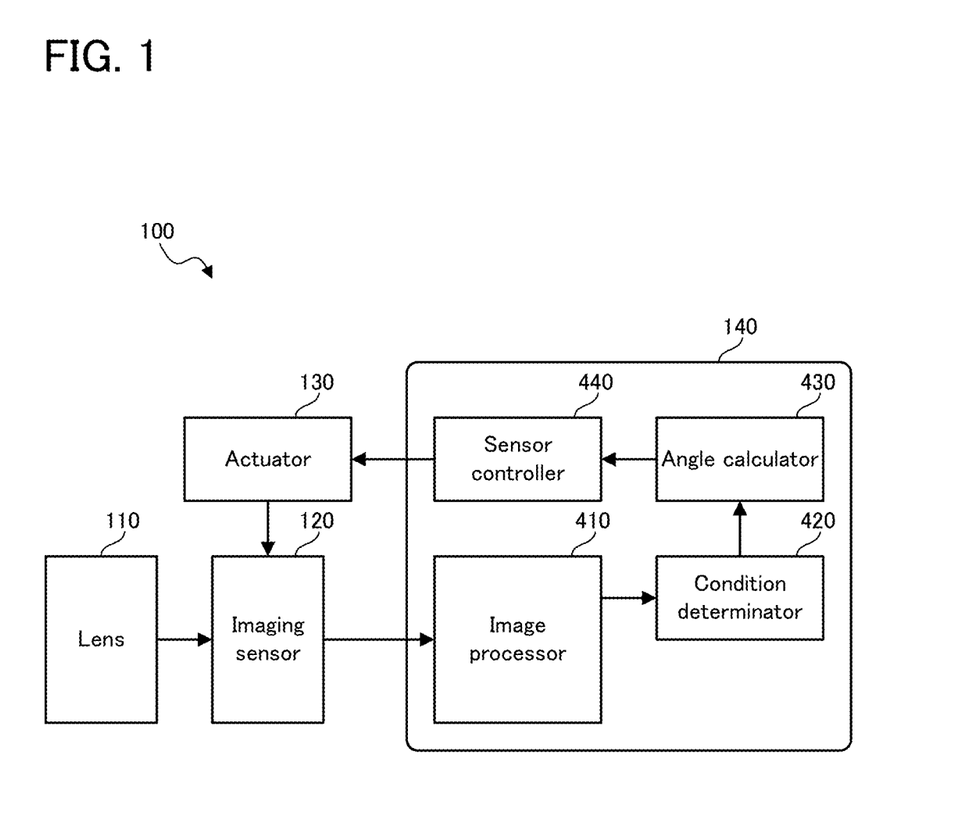
FIG. 1 is a block diagram illustrating a configuration of an imaging apparatus according to an embodiment.
Figure 2A:
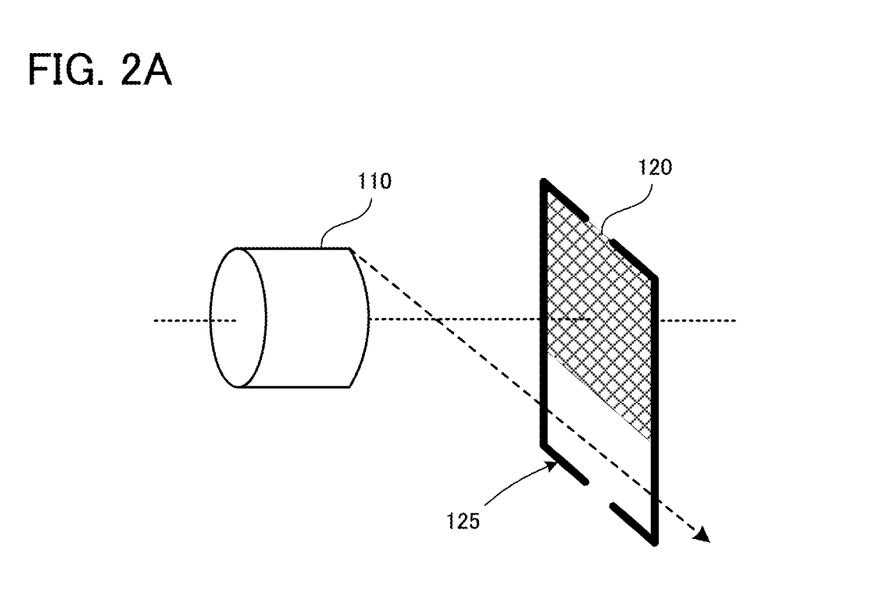
FIG. 2A is a perspective view illustrating a state before moving an imaging sensor.
Figure 2B:
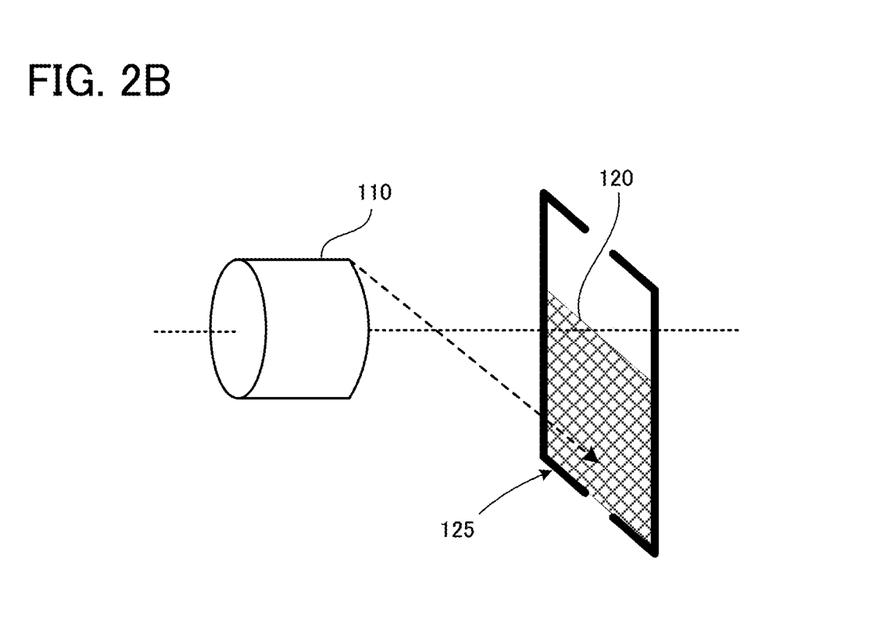
FIG. 2B is a perspective view illustrating a state after moving the imaging sensor.

Firstly, a configuration of an imaging apparatus according to an embodiment will be explained with reference to FIG. 1 to FIG. 2B. FIG. 1 is a block diagram illustrating the configuration of the imaging apparatus according to the embodiment. FIG. 2A and FIG. 2B are perspective views respectively illustrating states before and after moving an imaging sensor.

As illustrated in FIG. 1, an imaging apparatus 100 according to the embodiment is provided with a lens 110, an imaging sensor 120, an actuator 130, and a controller 140. The imaging apparatus 100 is mounted, for example, near a windshield of a vehicle, and is configured to image or photograph an image of a scene ahead of the vehicle. In imaging, a signal corresponding to light that enters from the lens 110 may be outputted from the imaging sensor 120, and the signal may be processed on an image processor 410, by which a photographed image is generated. The photographed image generated in this manner may be used, for example, for traffic light color recognition, obstacle detection, or the like.

On the imaging apparatus 100, a relative position of the imaging sensor 120 with respect to the lens 110 may be varied by the actuator 130. The operation of the actuator 130 may be controlled by a sensor controller 440, which is a specific example of the "controller" in Supplementary Notes described later. The sensor controller 440 is configured to control the actuator 130 on the basis of a reference angle calculated by an angle calculator 430, which is a specific example of the "calculator" in Supplementary Notes described later. The angle calculator 430 is configured to calculate the reference angle in accordance with a determination result of a condition determinator 420. The condition determinator 420 is configured to determine whether or not a condition in calculating the reference angle is satisfied, on the basis of the photographed image outputted from the image processor 410. A series of the operations here will be explained in detail later.

As illustrated in FIG. 2A and FIG. 2B, the imaging sensor 120 is configured to move in an upward/downward vertical direction. By this, the imaging sensor 120 can change a relative height with respect to the lens 110. The imaging sensor 120 is provided with a frame-shape stopped mechanism 125, and the imaging sensor 120 is configured to move in a movable area defined by the stopper mechanism 125. The stopper mechanism 125 may be to prevent excessive movement of the imaging sensor 120.

When the vehicle normally runs, the imaging sensor 120 is controlled to be at a normal position illustrated in FIG. 2A. The normal position may be an arrangement in which an imaging range appropriate for the running of a vehicle 10 is realized, and may be, for example, an arrangement in which light that passes through a center of the lens 110 out of light that enters perpendicular to the lens 110 (i.e., out of light that is parallel to an optical axis of the lens 110) enters a center of the imaging sensor 120. On the other hand, when the vehicle stops at a red light, the imaging sensor 120 is controlled to move lower than the normal position, as illustrated in FIG. 2B. If the imaging sensor 120 is moved downward from the normal position, the relative height of the imaging sensor 120 viewed from the lens 110 is reduced. In this case, light that emits from an upper side of the lens 110 enters the imaging sensor 120 (refer to a dashed arrow in FIG. 2A). More specifically, even the light that enters at a relatively shallow angle to the lens 110 (i.e., at an angle that is almost parallel to a surface of the lens 110) and whose imaging position or image-forming position is out of the imaging sensor 120 when the imaging sensor 120 is at the normal position, can enter the imaging sensor 120 by moving the imaging sensor 120 downward. As a result, the imaging range of the imaging apparatus 100 moves upward. As described above, the imaging apparatus 100 according to the embodiment is configured to change the imaging range by moving the imaging sensor 120 in the upward/downward direction.

<Deviation from Field Angle in Stopping at Red Light>

Figure 3A:
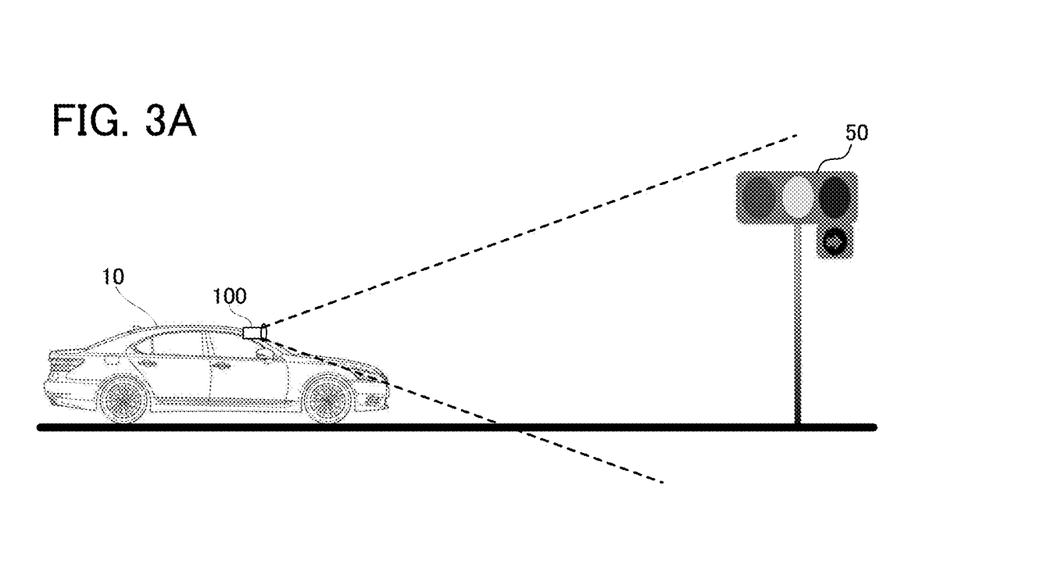
FIG. 3A is a conceptual diagram illustrating an example of a traffic light within a field angle or a viewing angle.
Figure 3B:
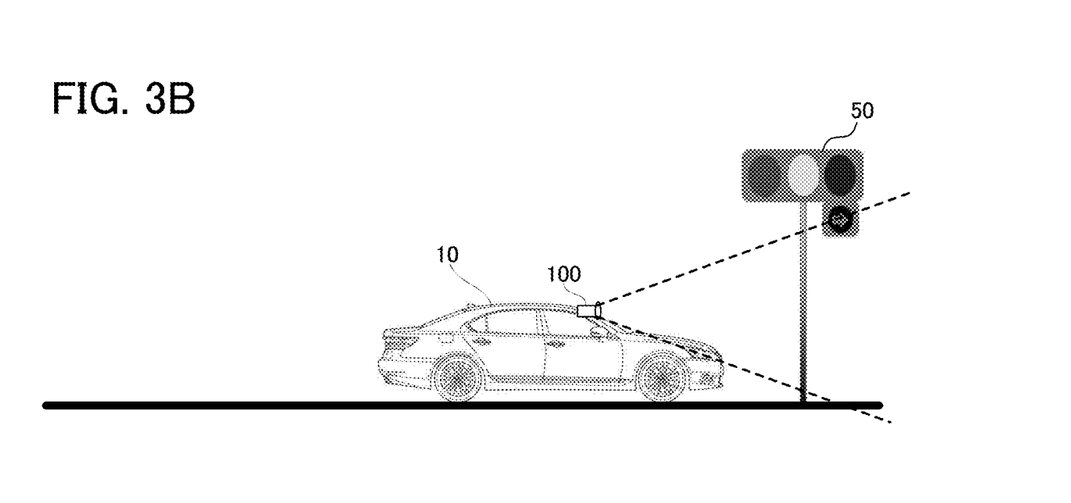
FIG. 3B is a conceptual diagram illustrating an example of deviation of the traffic light from the field angle, which occurs in stopping at a red light.

Next, deviation of the traffic light from a field angle or a viewing angle, which occurs when the vehicle stops at the red light, will be explained with reference to FIG. 3A and FIG. 3B. FIG. 3A and FIG. 3B are conceptual diagrams illustrating an example of the deviation of the traffic light from the field angle, which occurs in stopping at the red light.

As illustrated in FIG. 3A, if a distance between the vehicle 10 and a traffic light 50 is relatively long, the traffic light 50 is included in the imaging range of the imaging apparatus 100. On the other hand, if the distance between the vehicle 10 and the traffic light 50 is relatively short, the traffic light 50 is out of the imaging range of the imaging apparatus 100; namely, there may be the deviation from the field view. If there is the deviation of the traffic light 50 from the field view, for example, the color of the traffic light 50 cannot be recognized by using the photographed image.

If the traffic light 50 is green and if the vehicle 10 passes the traffic light 50, there is no problem even when the vehicle 10 approaches the traffic light and temporarily cannot recognize the color of the traffic light 50. However, if the traffic light 50 is red and if the vehicle 10 stops near the traffic light 50, the color of the traffic light 50 cannot be subsequently recognized, which may cause a detrimental effect. For example, an automatic start control performed by recognizing the color of the traffic light 50 (which is specifically a control of automatically starting the vehicle 10 when the traffic light changes from red to green) cannot be performed without recognizing the color of the traffic light 50.

The imaging apparatus 100 according to the embodiment is configured to perform an imaging sensor control operation, which will be explained below, in order to avoid the detrimental effect that can occur when the vehicle 10 stops, as described above.

<Imaging Sensor Control Operation>

Figure 4:
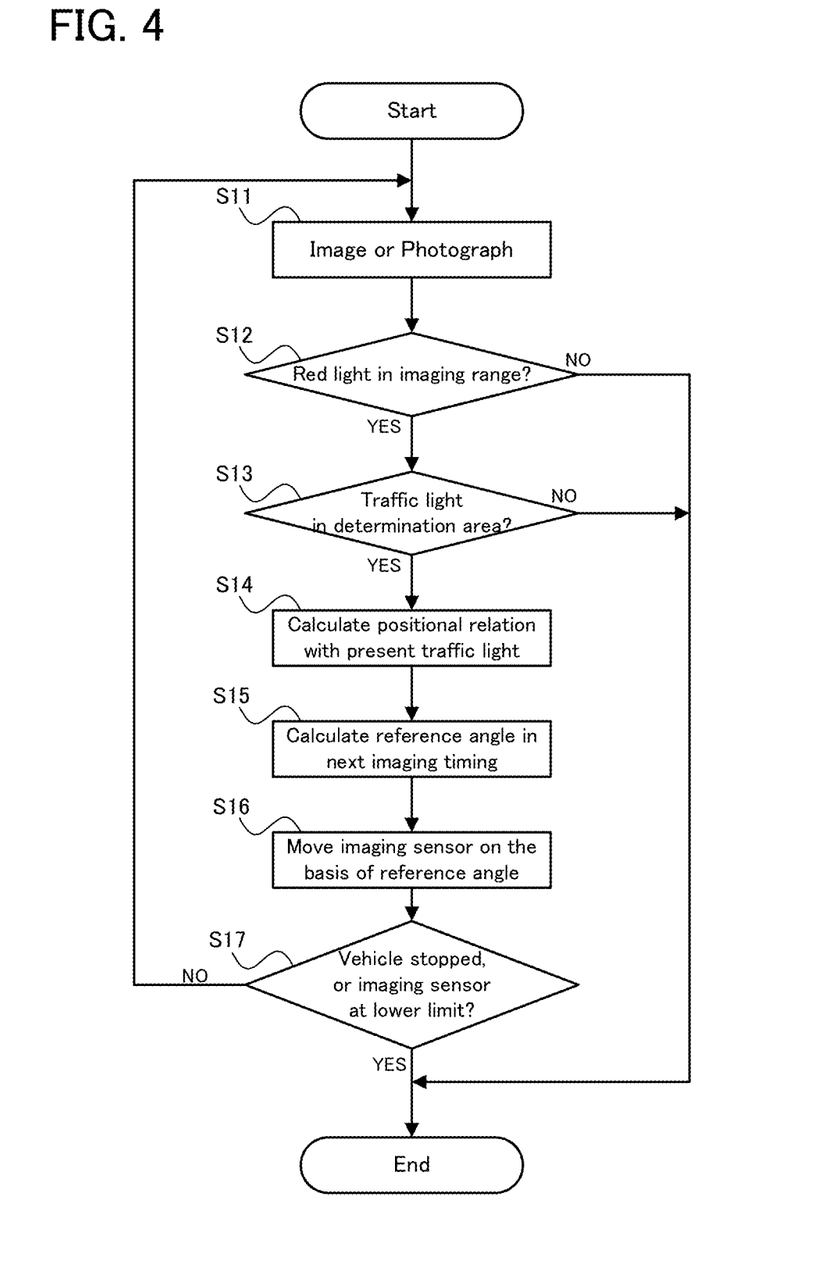
FIG. 4 is a flowchart illustrating a flow of an imaging sensor control operation on the imaging apparatus according to the embodiment.

The imaging sensor control operation performed on the imaging apparatus 100 according to the embodiment will be specifically explained with reference to FIG. 4. FIG. 4 is a flowchart illustrating a flow of the imaging sensor control operation on the imaging apparatus according to the embodiment.

As illustrated in FIG. 4, in operation of the imaging apparatus 100 according to the embodiment, firstly, a scene ahead of the vehicle is photographed or imaged (step S11). Specifically, a photographed image corresponding to the signal outputted from the imaging sensor 120 may be generated by the image processor 410. The photographed image may be outputted to the condition determinator 420.

The condition determinator 420 image-analyzes the photographed image and determines whether or not there is a red light in the imaging range (step S12). A specific method of determining the presence of the red light in the photographed image can use the existing technology/technique, as occasion demands, and thus, a detailed explanation of the method will be omitted herein.

If there is no red light in the imaging range (the step S12: NO), the subsequent process is omitted, and a series of operation steps is ended. In other words, if there is no traffic light 50 in the imaging range or if the traffic light 50 in the imaging range is green, the imaging sensor 120 is not controlled. After the end of the series of operation steps, the process may be started again from the step S11 after a lapse of a predetermined period.

Figure 5:
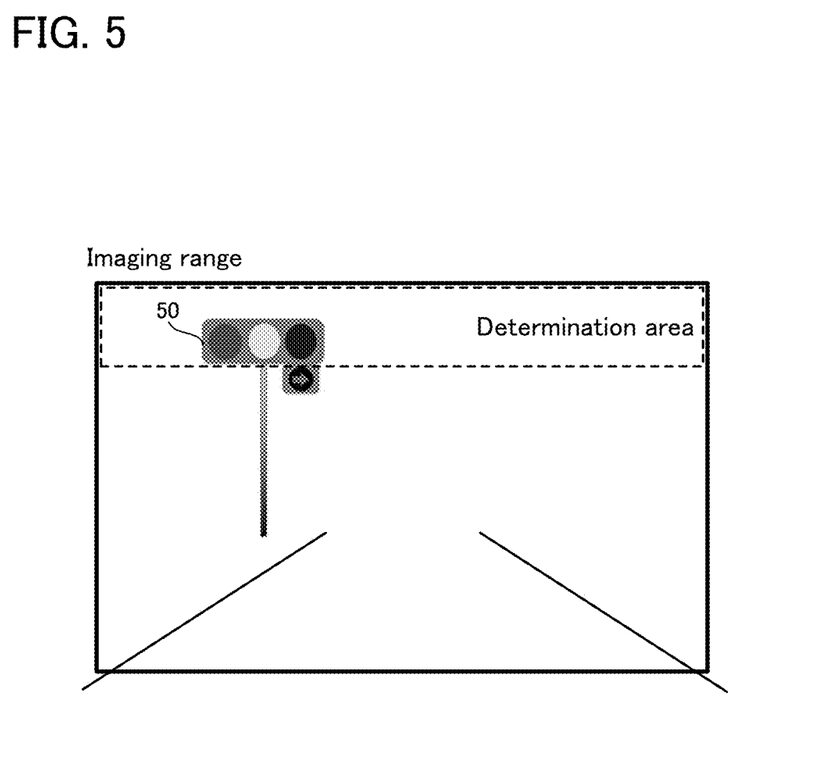
FIG. 5 is a plan view illustrating a determination area set in an imaging range.

If there is the red light in the imaging range (the step S12: YES), the condition determinator 420 further determines whether or not the traffic light 50 is in a determination area (step S13). Now, the determination area will be specifically explained with reference to FIG. 5. FIG. 5 is a plan view illustrating the determination area set in the imaging range.

As illustrated in FIG. 5, the determination area is a specific example of the "predetermined area" in Supplementary Notes described later, and is an area for determining whether or not there is a high possibility of the deviation of the traffic light from the field angle (refer to FIG. 3B). The determination area may be set as an area on an upper end of the imaging range (an area surrounded by a dashed line in FIG. 5). If the traffic light 50 is in the determination area in the surrounding of the upper end of the imaging range, as the vehicle further approaches the traffic light 50, the position of the traffic light 50 in the photographed image further moves upward, which likely end up causing the deviation of the traffic light 50 from the field angle. As described above, the use of the determination area makes it possible to easily determine whether or not the deviation of the traffic light 50 from the field angle is expected to occur.

A size of the determination area may be calculated in the following manner by using, for example, a camera imaging cycle f, a camera pixel number p, a camera field angle a, a camera axis angle d, a vehicle speed per hour v, a traffic light mounting height hs, and a vehicle height (or a camera mounting height) hv. Firstly, a distance A between the vehicle 10 and the traffic light 50 at which the deviation of the traffic light 50 from the field angle occurs is calculated by using the following equation (1).

$$A=(hs-hv)/\tan(a/2+d) \qquad (1)$$

Then, a distance B between the vehicle 10 and the traffic light 50 in timing of imaging or photographing a photographed image one frame before the deviation from the field angle is calculated by using the following equation (2).

$$B=A+(v/3.6)\times 1/f \qquad (2)$$

Then, a pixel position C obtained one frame before the deviation of the traffic light 50 from the field angle is calculated by using the following equation (3).

$$C=p/a\lambda(a/2-\arctan((hs-hv)/B)) \qquad (3)$$

If a value that is obtained by multiplying the aforementioned C by a margin coefficient α (i.e., a coefficient in which a vehicle change and an environmental change amount are considered) is set as a height width of the determination area, it is possible to set an appropriate determination area in view of the possibility of the deviation from the field angle after one frame. The determination area may be a fixed area with a preset height width, or may be, for example, a variable area in which the height width varies in real time.

Back in FIG. 4, if the traffic light 50 is not in the determination area (the step S13: NO), the subsequent process is omitted, and the series of operation steps is ended. In other words, even if there is the red light in the imaging range, if the red light is out of the determination area, the imaging sensor 120 is not controlled. After the end of the series of operation steps, the process may be started again from the step S11 after a lapse of a predetermined period.

Figure 6:
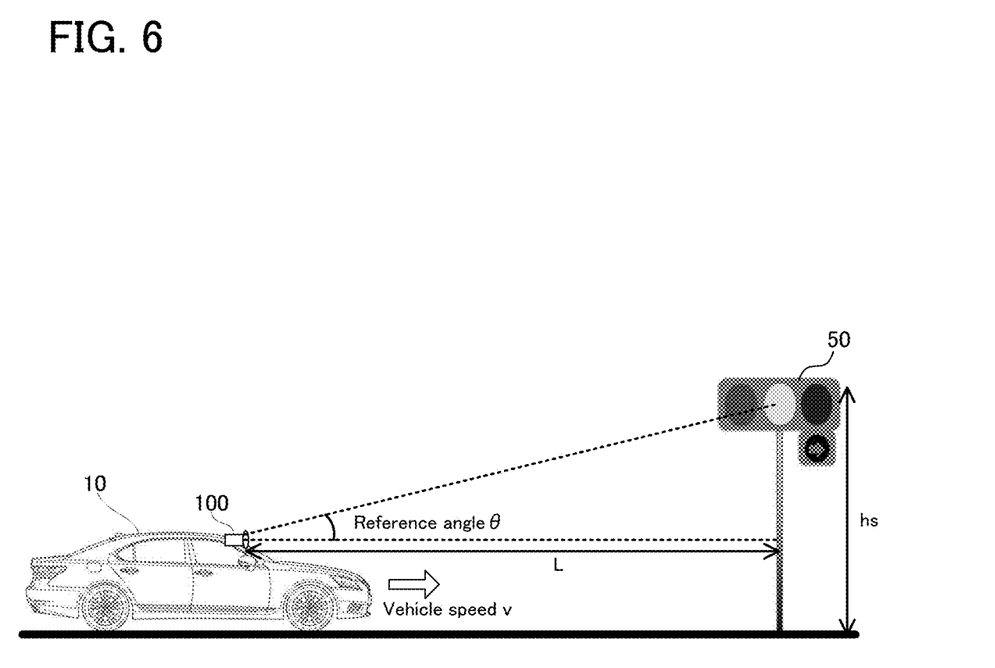
FIG. 6 is a conceptual diagram illustrating an example of a reference angle.

If the traffic light 50 is in the determination area (the step S13: YES), the condition determinator 420 outputs such a determination result that a predetermined condition for calculating a reference angle θ (i.e., a condition in which the traffic light 50 is red and in which the traffic light 50 is in the determination area) is satisfied, to the angle calculator 430. The angle calculator 430 may calculate the reference angle θ when receiving the determination result that the predetermined condition is satisfied. The reference angle θ may be an angle made by a line extending in a horizontal direction from the imaging apparatus 100 (or a line extending along (i.e., parallel to) a road surface on which the vehicle 1 runs) and a line extending to the traffic light 50 from the imaging apparatus 100.

When receiving the determination result from the condition determinator 420, the angle calculator 430 firstly calculates each parameter indicating a positional relation with the present traffic light 50 (step S14). Specifically, the angle calculator 430 may calculate each of a distance L0 from the present imaging apparatus 100 to the traffic light 50, the traffic light mounting height hs, and a present reference angle θ0.

The angle calculator 430 then calculates a reference angle θ1 after one frame (in other words, the reference angle θ for the next imaging timing) by using the camera imaging cycle f and the vehicle speed per hour v, in addition to the distance L0 to the traffic light 50, the traffic light mounting height hs, and the present reference angle θ0, which are described above (step S15). In calculating the reference angle θ1 after one frame, a distance L1 to the traffic light 50 after one frame may be calculated by using the following equation (4).

$$L1=L0-v/3.6/f \qquad (4)$$

Then, the reference angle θ1 after one frame may be calculated by using the following equation (5).

$$(\theta1=\arctan(hs/L1) \qquad (5)$$

The reference angle θ calculated by the angle calculator 430 (which is specifically the reference angle θ1 after one frame) may be outputted to the sensor controller 440. The sensor controller 440 controls the actuator 130 on the basis of the reference angle θ (step S16). The actuator 130 may complete moving the imaging sensor 120 before the imaging timing after one frame. In other words, the actuator 130 may complete moving the imaging sensor 120 before the positional relation with the traffic light 50 corresponds to the calculated reference angle θ1 after one frame.

Figure 7:
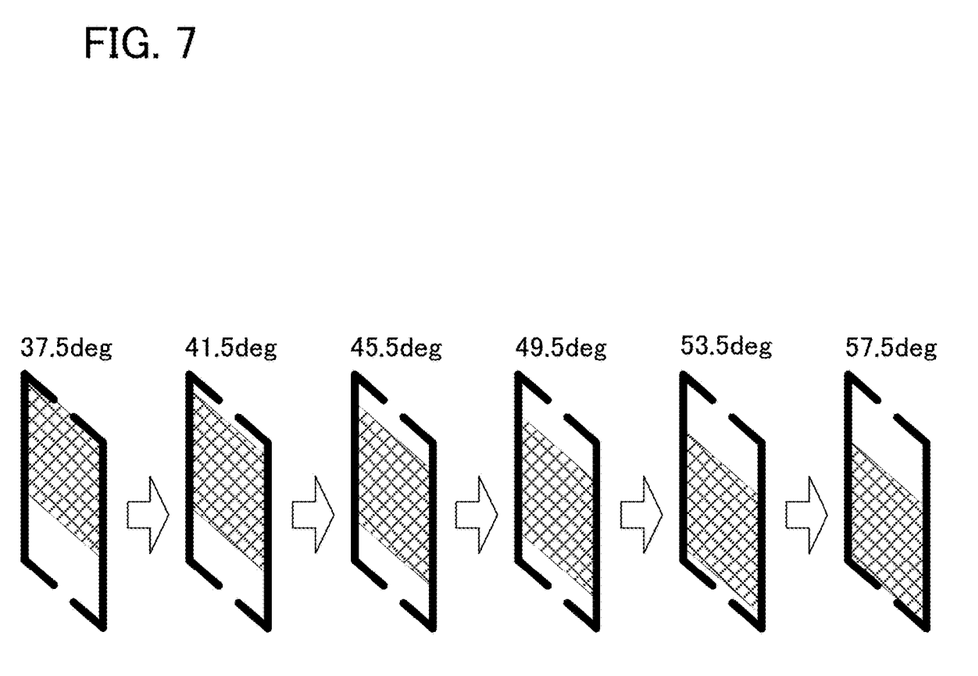
FIG. 7 is a conceptual diagram illustrating a control of the imaging sensor based on the reference angle.

Now, the control of the imaging sensor 120 based on the reference angle θ will be specifically explained with reference to FIG. 7. FIG. 7 is a conceptual diagram illustrating the control of the imaging sensor based on the reference angle.

As illustrated in FIG. 7, the position of the imaging sensor 120 (in other words, a moving amount) may be determined on the basis of the reference angle θ. Specifically, as the value of the reference angle θ increases, the imaging sensor 120 is moved downward. As a result, as the value of the reference angle θ increases, the imaging range of the imaging apparatus 100 is moved upward. A relation between the reference angle θ and the imaging sensor 120 in FIG. 7 is merely an example. The setting may be performed so that the traffic light 50 is certainly included in the imaging range, in view of a mounting position of the imaging sensor 120, the field angle, or the like.

Back in FIG. 4 again, after the imaging sensor 120 is moved, it is determined whether the vehicle 10 is stopped, or the position of the imaging sensor 120 reaches a lower limit (step S17). If it is determined that the vehicle 10 is stopped (the step S17: YES), the position of the traffic light 50 viewed from the imaging apparatus 100 does not change. Thus, the subsequent position control of the imaging sensor 120 is determined to be unnecessary, and the series of operation steps is ended. In the same manner, if the position of the imaging sensor 120 reaches the lower limit (the step S17: YES), the imaging sensor 120 cannot be moved downward, and thus, the series of operation steps is ended.

On the other hand, if it is determined that the vehicle 10 is not stopped and if the position of the imaging sensor 120 does not reach the lower limit (the step S17: NO), the process is restarted from the step S11. By repeating the process in this manner, the reference angle θ may be repeatedly calculated in accordance with the imaging cycle, and the position control of the imaging sensor 120 may be performed in accordance with the calculated reference angle θ. It is thus possible to realize the appropriate imaging range in accordance with the actual positional relation between the vehicle 10 and the traffic light 50.

If the red light is changed to green in the middle of the aforementioned series of operation steps and the vehicle 10 thus does not need to stop at the red light, or if the red light is changed to green after the end of the series of operation steps and the vehicle 10 is determined to start to run, then, the sensor controller 440 may control the operation of the actuator 130 and may return the position of the imaging sensor 120 to the normal position (refer to FIG. 2A). In this manner, it is possible to prevent that the imaging range remains on the upper side even though the vehicle 10 starts normal running.

Technical Effect

Next, a technical effect obtained by the aforementioned imaging sensor control operation will be specifically explained with reference to FIG. 8A to FIG. 8E. FIG. 8A to FIG. 8E are conceptual diagrams illustrating a change in the imaging range in approaching the traffic light according to the embodiment and a comparative example.

Figure 8A:
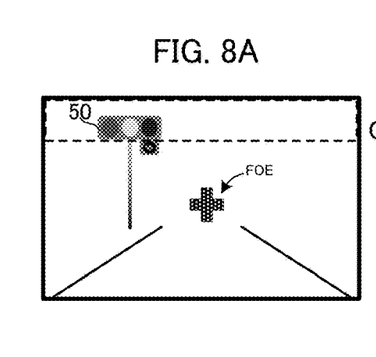
FIG. 8A to FIG. 8E are conceptual diagrams illustrating a change in the imaging range in approaching the traffic light according to the embodiment and a comparative example.
Figure 8B:
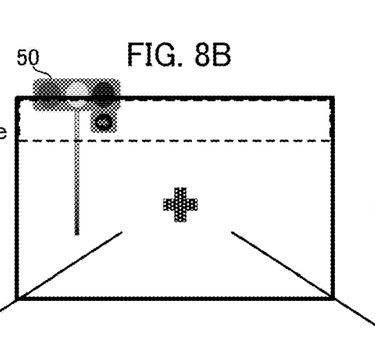
Figure 8C:
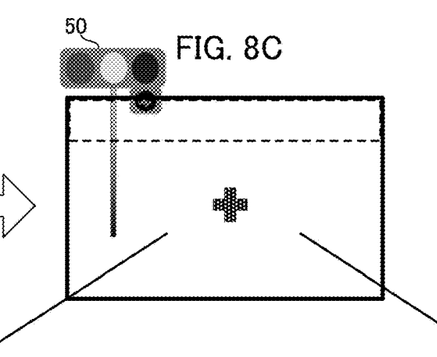
Figure 8D:
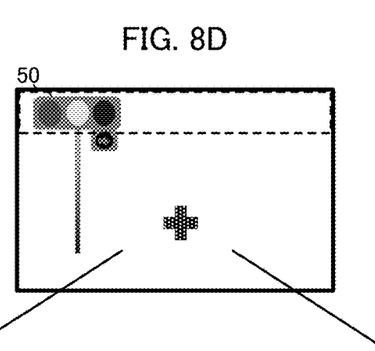
Figure 8E:
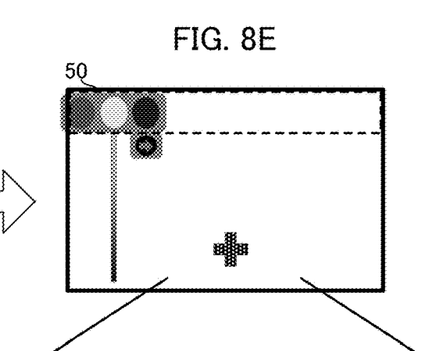

As illustrated in FIG. 8A to FIG. 8C, on an imaging apparatus according to the comparative example, the imaging sensor 120 is not moved on the basis of the reference angle θ. Thus, even when the vehicle 10 stops at the red light (specifically, when the vehicle approaches the traffic light 50 and eventually stops), the imaging range is not moved. As a result, as is clear from FIG. 8A to FIG. 8C, the deviation of the traffic light 50 from the field angle occurs as the vehicle 10 approaches the traffic light 50.

On the other hand, on the imaging apparatus 100 according to the embodiment, the imaging sensor 120 is moved on the basis of the reference angle θ. Thus, when the vehicle 10 stops at the red light, the imaging range is gradually moved upward. As a result, as is clear from FIG. 8A, FIG. 8D, and FIG. 8E, the deviation of the traffic light 50 from the field angle does not occur even when the vehicle 10 approaches the traffic light 50.

As explained above, according to the imaging apparatus 100 in the embodiment, it is possible to prevent the deviation of the traffic light 50 from the field angle, by changing the position of the imaging sensor 120 on the basis of the reference angle θ. Specifically, even when the vehicle 10 stops close to the traffic light 50 and the traffic light 50 is located nearly just above as viewed from the vehicle, it is possible to certainly include the traffic light 50 in the imaging range. Moreover, the reference angle θ is repeatedly calculated in all the imaging timings, and thus, the appropriate imaging range is realized in accordance with the positional relation with the traffic light 50 at that time. Specifically, if the vehicle 10 approaches the traffic light 50 while decelerating, the imaging range is gradually moved upward, and the traffic light 50 can be always included in the imaging range.

In the embodiment, moreover, the imaging range is changed by moving the imaging sensor 120 that is relatively light. It is thus possible to change the imaging range while suppressing an impact in the movement and current consumption required for the movement.

Supplementary Notes

Various aspects of embodiments of the present disclosure derived from the embodiment explained above will be explained hereinafter.

Supplementary Note 1

An imaging apparatus described in Supplementary Note 1 is an imaging apparatus configured to photograph an image of a scene ahead of a vehicle, the imaging apparatus provided with: an actuator configured to move an imaging range in an upward/downward direction by moving an imaging sensor in the upward/downward direction and adjusting a relative position of the imaging sensor with respect to a lens; a calculator configured to calculate a reference angle, which is an angle made by a line extending in a moving direction of the vehicle from the imaging sensor and a line extending to a traffic light, which is ahead of the vehicle, from the imaging sensor; and a controller programmed to control the actuator to include the traffic light in the imaging range on the basis of the reference angle.

According to the imaging apparatus described in Supplementary Note 1, in operation thereof, the reference angle is firstly calculated, wherein the reference angle is an angle of the traffic light viewed from the imaging sensor. The reference angle is an angle in a height direction, and is more specifically the angle made by the line extending in the moving direction of the vehicle from the imaging sensor (in other words, along a road surface on which the vehicle runs) and the line extending to the traffic light from the imaging sensor. If the road surface on which the vehicle runs is along a horizontal surface, the reference angle may be an angle made by a line extending in a horizontal direction from the imaging sensor and the line extending to the traffic light from the imaging sensor, i.e., an elevation angle.

After the reference angle is calculated, the position of the imaging sensor is moved in the upward/downward direction on the basis of the reference angle, and the relative height of the imaging sensor with respect to the lens is adjusted. By this, the imaging range of the imaging apparatus is moved in the upward/downward direction.

When the vehicle approaches the traffic light, the position of the traffic light viewed from the imaging apparatus is moved upward. Thus, if the imaging range of the imaging apparatus is fixed, the traffic light is likely out of the imaging range, for example, when the vehicle stops at the red light or in similar cases. On the imaging apparatus described in Supplementary Note 1, however, the position of the imaging sensor of the vehicle is controlled, by which the imaging range is moved in the upward/downward direction. It is thus possible to move the imaging range in the upward/downward direction and to include the traffic light in the imaging range even when the vehicle approaches the traffic light and the traffic light is likely out of the imaging range. Moreover, the imaging range is moved on the basis of the aforementioned reference angle, i.e., the angle of the traffic light viewed from the imaging sensor. Thus, the imaging range is appropriately moved due to the position relation with the traffic light, and, for example, even when the vehicle decelerates to stop at the red light, i.e., when the vehicle gradually approaches the traffic light, or in similar cases, it is possible to continue to include the traffic light in the imaging range.

What is controlled (or driven) in moving the imaging range is only the imaging sensor that is relatively light. It is thus possible to control the imaging range, easily and appropriately, for example, in comparison with when the lens and an apparatus main body are driven.

Supplementary Note 2

In the imaging apparatus described in Supplementary Note 2, the calculator is configured to calculate the reference angle if a color of the traffic light is red and if the traffic light is located in a predetermined area in the imaging range.

According to the imaging apparatus described in Supplementary Note 2, the control of the imaging sensor based on the reference angle, i.e., the control of the imaging range, is performed if the color of the traffic light is red and if the traffic light is located in the predetermined area in the imaging range. The "predetermined area" herein may be an area for determining whether or not the traffic light is at a position at which the traffic light is likely out of the imaging range of the imaging apparatus. Specifically, the predetermined area may be set as an area on an upper end side of the imaging range.

If the traffic light is green and if the vehicle passes the traffic light, there is a low possibility of a problem even when the traffic light is temporarily out of the imaging range. On the other hand, if the traffic light is red and if the vehicle stops near the traffic light, the color of the traffic light cannot be subsequently recognized, which may cause a detrimental effect. For example, an automatic start control performed by recognizing the color of the traffic light cannot be performed. Thus, if the imaging range is controlled when the color of the traffic light is red, it is possible to move the imaging range in appropriate timing. It is also possible to prevent an unnecessary control of the imaging range by controlling the imaging range if the traffic light is located in the predetermined area in the imaging range.

Supplementary Note 3

In the imaging apparatus described in Supplementary Note 3, the calculator is configured to repeatedly calculate the reference angle until the vehicle stops near the traffic light or the relative height of the imaging sensor with respect to the lens reaches a lower limit value, on condition that a color of the traffic light is red, and the controller is programmed to control said actuator on the basis of the reference angle every time the reference angle is calculated.

According to the imaging apparatus described in Supplementary Note 3, the position of the imaging range is controlled stepwise until the vehicle stops near the traffic light or the relative height of the imaging sensor with respect to the lens reaches the upper limit value. Thus, the imaging range is moved to an appropriate position in accordance with the positional relation between the vehicle and the traffic light.

Supplementary Note 4

In the imaging apparatus described in Supplementary Note 4, the calculator is configured to calculate the reference angle at a position of the vehicle for next imaging timing, and the controller is programmed to control said actuator on the basis of the reference angle calculated for the next imaging timing before an arrival of the next imaging timing.

According to the imaging apparatus described in Supplementary Note 4, it is possible to move the imaging range in actual imaging timing to a more appropriate position, i.e., a position corresponding to the positional relation with the traffic light, by calculating the reference angle for the next imaging timing in advance.

Supplementary Note 5

In the imaging apparatus described in Supplementary Note 5, it is further provided with a stopper mechanism configured to limit a movable area of the imaging sensor.

According to the imaging apparatus described in Supplementary Note 5, it is possible to prevent that an excessive change in the position of the imaging sensor causes the imaging range to be inappropriate.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle camera configured to photograph an image of a scene ahead of a vehicle, the vehicle camera comprising:
   a fixed lens;
   an imaging sensor within the vehicle camera;
   an actuator configured to move an imaging range of the vehicle camera in an upward/downward direction by moving the imaging sensor within the vehicle camera in an upward or downward vertical direction so as to adjust a relative position of the imaging sensor within the vehicle camera with respect to the fixed lens within the vehicle camera; and
   a controller configured to:
      obtain a photographed image based on image data obtained by the imaging sensor within the vehicle camera;
      analyze the photographed image and determine whether or not there is a traffic light having a color corresponding to stop in the photographed image; and
      in a case that there is a traffic light having the color corresponding to stop in the photographed image:
         calculate a future reference angle, which is an angle made by a line extending in a moving direction of the vehicle from the imaging sensor at a future position and a line extending to the traffic light, which is ahead of the vehicle, from the imaging sensor at the future position; and
         control the actuator to move the imaging sensor within the vehicle camera in the upward or downward vertical direction to maintain inclusion of the traffic light in the imaging range of the imaging sensor within the vehicle camera based on the calculated future reference angle.

2. The vehicle camera according to claim 1, wherein the controller is further configured to calculate the future reference angle based on the traffic light that includes the color corresponding to stop being located in a predetermined area in the imaging range.

3. The vehicle camera according to claim 1, wherein the controller is further configured to:
   repeatedly calculate future reference angles until the vehicle stops near the traffic light or until a relative height of the imaging sensor with respect to the fixed lens reaches a lower limit value, and
   control the actuator to move the imaging sensor based on a respective one of the future reference angles every time one of the respective reference angles is calculated.

4. The vehicle camera according to claim 1, wherein the controller is further programmed to:
   calculate the future reference angle at the future position, which is a position corresponding to the vehicle being in a future image frame, which is a next image frame to be obtained; and
   control the actuator based on the calculated future reference angle calculated for the future image frame.

5. The vehicle camera according to claim 1, further comprising a frame configured to hold the imaging sensor and a frame stop configured to limit a movable area of the imaging sensor within the frame.

6. The vehicle camera according to claim 1, wherein the color corresponding to stop is red.

7. The vehicle camera according to claim 2, wherein the controller is further configured to calculate the predetermined area based on vehicle speed and lengths of the lines.

* * * * *